United States Patent [19]

Hagino et al.

[11] Patent Number: 5,038,203
[45] Date of Patent: Aug. 6, 1991

[54] BURST GATE PULSE GENERATING CIRCUIT

[75] Inventors: Hideyuki Hagino, Fukaya; Teruo Okada, Fujioka, both of Japan

[73] Assignee: Kabushiki Kaisha Toshiba, Kawasaki, Japan

[21] Appl. No.: 371,001

[22] Filed: Jun. 26, 1989

[30] Foreign Application Priority Data

Jun. 29, 1988 [JP] Japan .................. 63-161342

[51] Int. Cl.⁵ .................................. H04N 9/455
[52] U.S. Cl. ............................ 358/20; 358/19
[58] Field of Search ...................... 358/20, 19, 36

[56] References Cited

U.S. PATENT DOCUMENTS

| | | | |
|---|---|---|---|
| 3,585,285 | 6/1971 | Rennick | 358/20 |
| 3,949,418 | 4/1976 | Srivastava | 358/20 |
| 4,228,456 | 10/1980 | Lovely | 358/20 |
| 4,410,907 | 10/1983 | Vinekar | 358/20 |

FOREIGN PATENT DOCUMENTS 2146199 4/1985 United Kingdom .

*Primary Examiner*—Tommy P. Chin
*Attorney, Agent, or Firm*—Finnegan, Henderson, Farabow, Garrett and Dunner

[57] ABSTRACT

A first circuit generates a first voltage which increases at a predetermined time constant in synchronism with the leading edge of a pulse contained in a sync signal. A second circuit compares the first voltage with a fixed second voltage. When the trailing edge of the pulse contained in the sync signal arrives at the first circuit before the increasing first voltage reaches the fixed second voltage, the first circuit stops generating the first voltage. A third circuit compares the first voltage with a fixed third voltage and a fixed fourth voltage which are higher than the fixed second voltage, and generates a train of burst gate pulses which become high in level after the first voltage exceeds the fixed third voltage, and low in level after the first voltage exceeds the fixed fourth voltage.

13 Claims, 4 Drawing Sheets

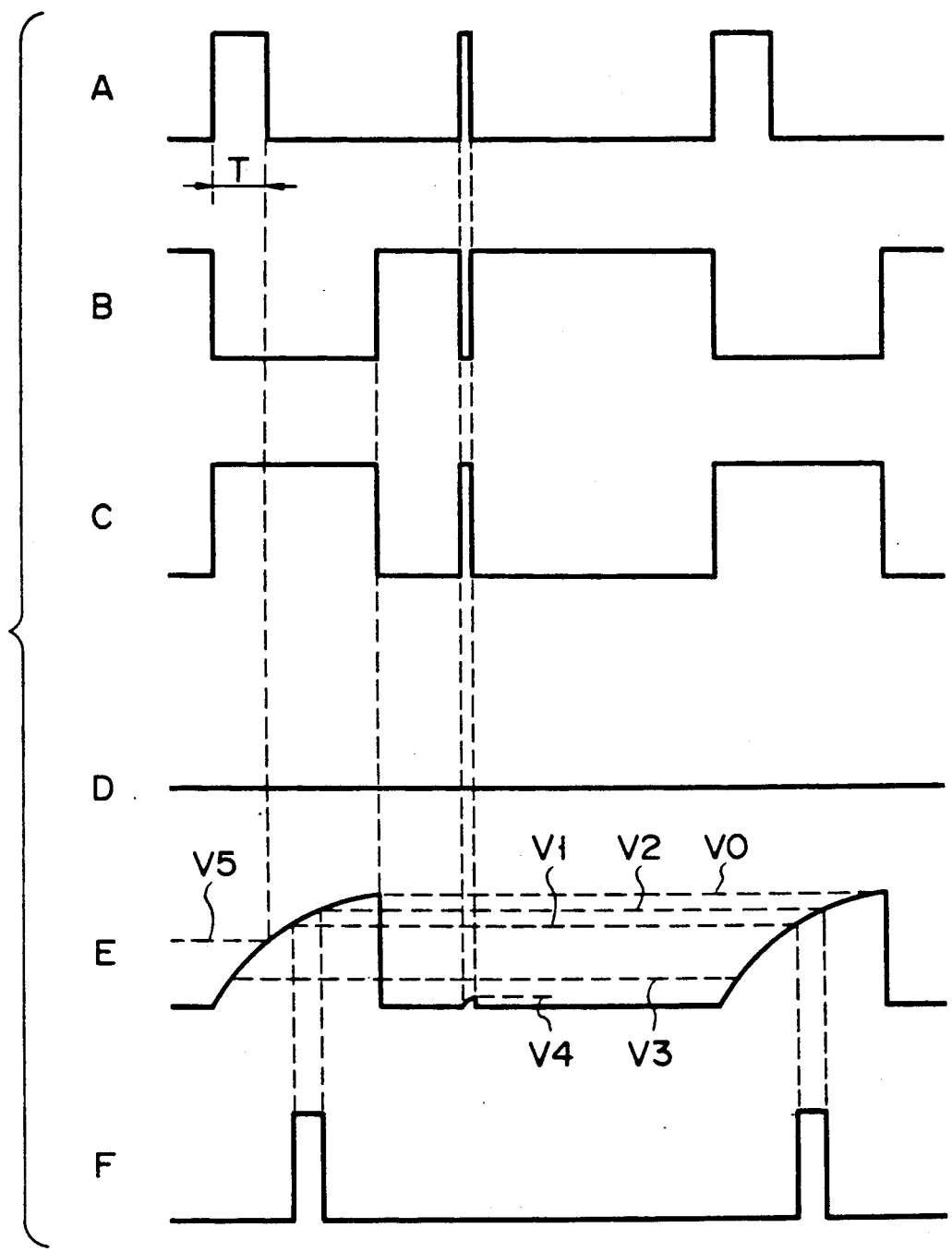
F I G. 4

BURST GATE PULSE GENERATING CIRCUIT

BACKGROUND OF THE INVENTION

1. Field of the Invention

The present invention relates to a video signal processing circuit, and more particularly to a burst gate pulse generating circuit for generating a burst gate pulse for extracting a burst signal from a sync separation output signal.

2. Description of the Related Art

Generally, a burst gate pulse generating circuit is used in a color television set, a video tape recorder, and the like. A sync separation signal is supplied to a burst gate pulse generating circuit which in turn generates a burst gate pulse. The burst gate pulse derived from the burst gate pulse generating circuit is used as a gate pulse for the burst signal detection in a color synchronizing circuit. The same is also used in an AGC (automatic gain control) circuit, as a key pulse for AGC detection. Specifically, in the AGC circuit, a potential of the video signal at the pedestal portion is extracted by using the burst gate pulse. This potential at the pedestal portion is compared with a reference potential. By using the comparison result, the gain of the AGC circuit is controlled so that the amplitude of the sync signal is kept constant. The burst gate pulse is used as a reference signal in the ACC (automatic color control) detection mode.

As just mentioned, the burst gate pulse is used as reference signals in the video circuits. Therefore, high exactness is required for the pulse width and the pulse position of the burst gate pulse. Actually, however, noise is frequently introduced into the sync separation signal. The introduced noise leads to improper operation of the burst gate pulse generating circuit, and consequently generation of a mistaken burst gate pulse.

An example of a conventional burst gate pulse generating circuit is illustrated in FIG. 1. In the figure, reference symbol IN indicates an input terminal for receiving a sync separation circuit; OUT an output terminal for outputting a burst gate pulse; Q1 to Q16, npn or pnp transistors; R1 to R13, resistors; C1 a capacitor; V1 and V2 constant voltage sources; I1 and I2 constant current sources; and A1 to A3, differential amplifiers. A value of the constant voltage source V2 is higher than that of the constant voltage source V1.

FIG. 2 shows a timing chart useful in explaining the operation of the bust gate pulse generating circuit shown in FIG. 1. In FIG. 2, a waveform A represents a variation of a sync separation signal applied to the input terminal IN; a waveform B, a voltage variation of a base signal of each of the transistors Q2, Q8 and Q15; a waveform C, a voltage variation of a base signal of each of the transistors Q4 and Q7 or a current variation of at the collector of each of the transistors Q5 and Q6; a waveform D, a voltage variation of a base signal of the transistor Q3; and a waveform E, a variation of a burst gate pulse derived from the output terminal OUT.

The operation of the above burst gate pulse generating circuit will be described in brief. When a sync signal rises to "1" level, charge to the capacitor C1 starts and it is charged by the power source voltage $V_{CC}$ via the resistor R3. With progression of the charging operation, a base voltage of the transistor Q3 rises at a given time constant as indicated by the waveform D in FIG. 2. The base voltage of the transistor Q3 exceeds a voltage V0 that is obtained by dividing the power source voltage $V_{CC}$ by the resistors R4, R7 and R6. At this time, the transistor Q3 is turned on, while the transistor Q4 is turned off. In turn, the transistors Q5, Q6 and Q7 are also turned off. The turning off of the transistor Q7 places the bases of the transistors Q2, Q8 and Q15 in a "1" level, as indicated by the waveform B.

When the base voltage of the transistor Q3 rises and exceeds the voltage of the constant voltage source V1, the transistor Q14 is turned on and a signal at the output terminal OUT rises to a level of "1". See the waveform E in FIG. 2. The base voltage of the transistor Q3 further rises and exceeds the value of the constant voltage source V2. The transistor Q9 is turned off, and the signal at the output terminal OUT drops again to "0", as indicated by the waveform E.

In this way, in the conventional burst gate pulse generating circuit, a pulse signal with a predetermined pulse width is generated in synchronism with the leading edge of the pulse contained in the sync separation signal.

Also in response to the noise contained in the sync separation signal, the burst gate pulse generating circuit operates to generate pulses in a similar way.

SUMMARY OF THE INVENTION

Accordingly, an object of the present invention is to provide a burst pulse generating circuit which is free from an improper operation due to the noise mixed into an input signal.

According to the present invention, there is provided a burst gate pulse generating circuit comprising: first circuit means for generating a first voltage increasing at a predetermined time constant in synchronism with the leading edge of a pulse contained in a sync signal applied thereto; second circuit means for stopping the first voltage generating operation by said first circuit means when the trailing edge of said pulse contained in said sync signal arrives at said first circuit means before said first voltage reaches a fixed second voltage; and third circuit means for generating a train of burst gate pulses through the comparison of said first voltage derived from said first circuit means with fixed second and third voltages which are larger than said second voltage, and different from each other.

BRIEF DESCRIPTION OF THE DRAWINGS

FIG. 4 shows a timing chart useful in explaining the operation of the FIG. 3 circuit.

DETAILED DESCRIPTION OF THE PREFERRED EMBODIMENT

Figure 1:
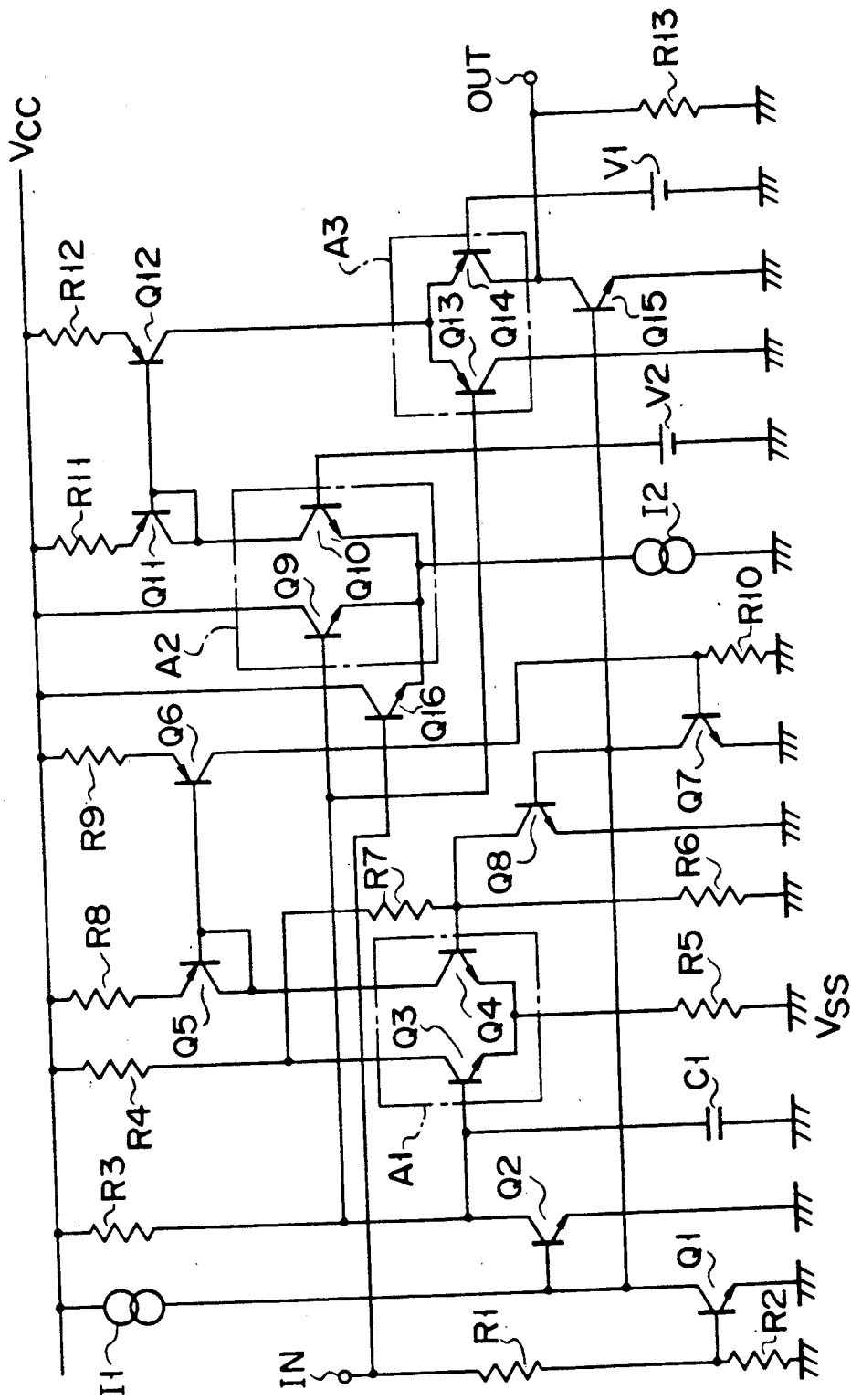
FIG. 1 is a circuit diagram of a conventional burst gate pulse generating circuit.
Figure 2:
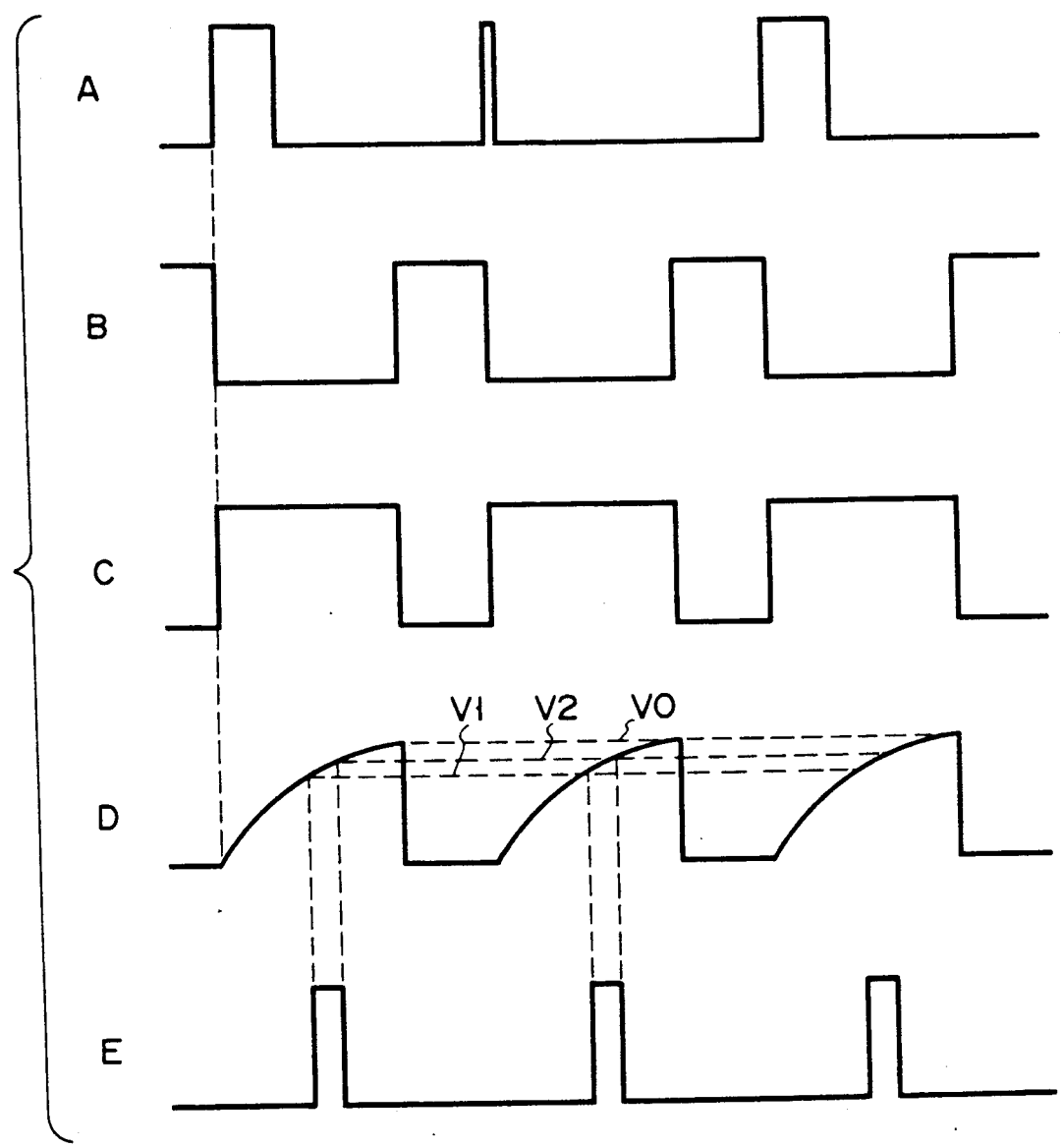
FIG. 2 shows a timing chart useful in explaining the operation of the FIG. 1 circuit.
Figure 3:
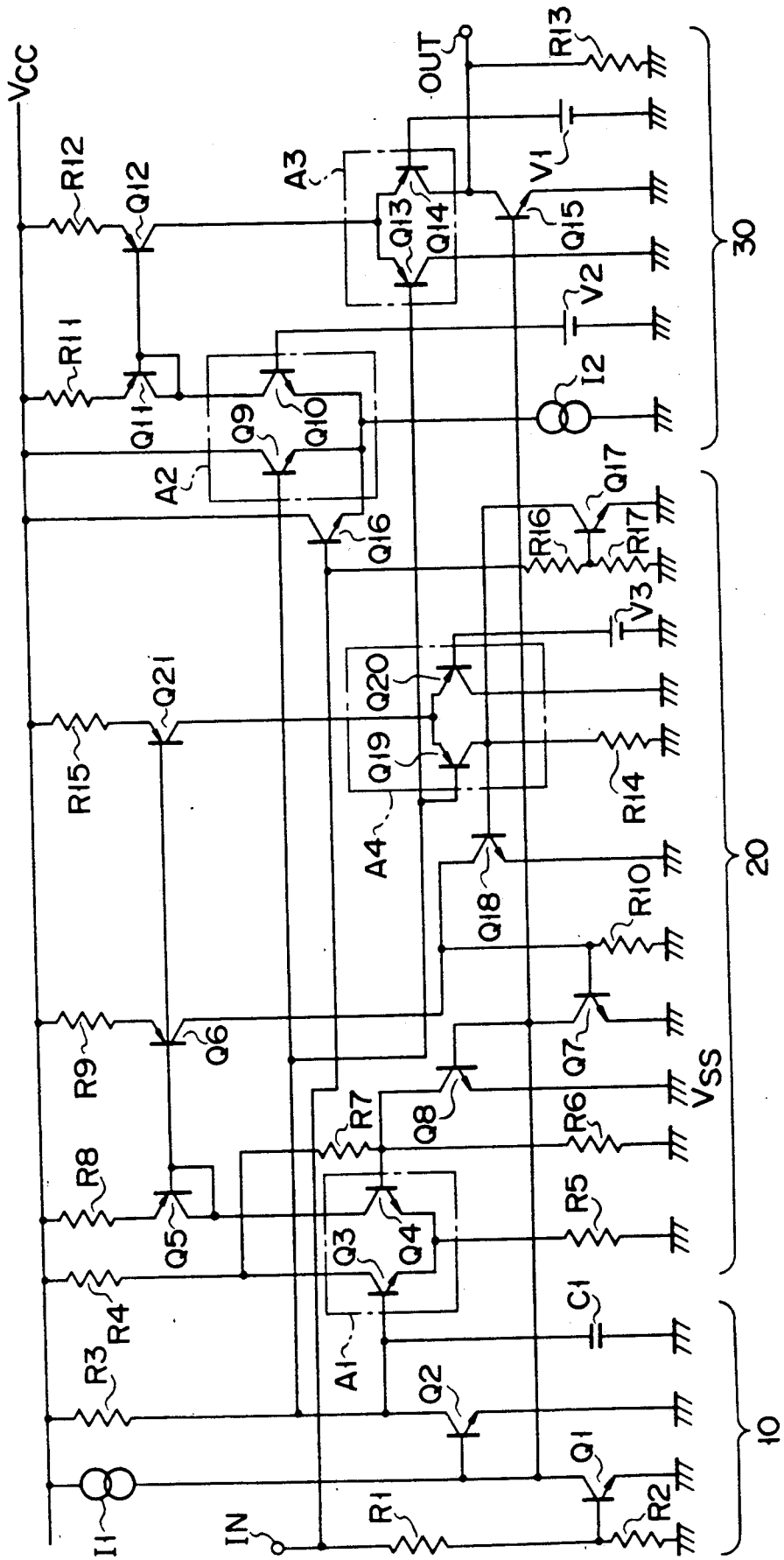
FIG. 3 is a circuit diagram of a burst gate pulse generating circuit according to an embodiment of the present invention.

Reference is made to FIG. 3 showing a burst gate pulse generating circuit according to an embodiment of the present invention.

In the figure, the base of an npn transistor Q1 is coupled through a resistor R1 with an input terminal IN that is coupled for reception with a sync separation signal. The same base is also connected through a resistor R2 to a ground potential $V_{SS}$. The emitter of the transistor Q1 is connected to the ground potential $V_{SS}$, and the collector thereof is connected to a power source potential $V_{CC}$ through a constant current source I1. The same collector is further connected to the base of an npn transistor Q2. The transistor Q2 is connected at the emitter to the ground potential $V_{SS}$, and at the collector to the power source potential $V_{CC}$ via a resistor R3. The collector of the transistor Q2 is further connected to the ground potential $V_{SS}$ via a capacitor C1, and to the base of an npn transistor Q3. These transistors Q1 and Q2, resistors R1 to R3, a capacitor C1 and constant current source I1 make up a first circuit 10.

The collector of the transistor Q3 is coupled with the power source potential $V_{CC}$ via a resistor R4, and the emitter thereof is connected to the ground potential $V_{SS}$ via a resistor R5. The emitter of the same transistor is also connected to the emitter of an npn transistor Q4. The transistors Q3 and Q4 whose emitters are interconnected make up a first differential amplifier A1. The base of the transistor Q4 is connected through a resistor R6 to the ground potential $V_{SS}$, and through a resistor R7 to the collector of the transistor Q3.

The collector of the transistor Q4 is connected to the collector and the base of a pnp transistor Q5. The emitter of the transistor Q5 is connected through a resistor R8 to the power source potential $V_{CC}$. The base of the transistor Q5 is connected to the base of a pnp transistor Q6. The emitter of the transistor Q6 is connected through a resistor R9 to the power source potential $V_{CC}$, and the collector thereof is connected through a resistor R10 to the ground potential $V_{SS}$ and to the base of the transistor Q7. The emitter of the transistor Q7 is coupled with the ground potential $V_{SS}$, and the collector thereof is connected to the base of an npn transistor Q8. The emitter of the transistor Q8 is coupled with the ground potential $V_{SS}$, and the collector thereof is connected to the base of the transistor Q4.

The collector of the transistor Q2 is connected to the base of an npn transistor Q9. The collector of the transistor Q9 is connected to the power source potential $V_{CC}$, and the emitter thereof is connected to the emitter of an npn transistor Q10. The transistor Q9 and the transistor Q10 whose emitters are interconnected make up a second differential amplifier A2. The emitters of these transistors Q9 and Q10 are connected through a constant current source I2 to the ground potential $V_{SS}$. The base of the transistor Q10 is connected to the ground potential $V_{SS}$ via a constant voltage source V2. The collector of the transistor Q10 is connected to the collector and the base of a pnp transistor Q11. The emitter of the transistor Q11 is connected through a resistor R11 to the power source potential $V_{CC}$. The base of the transistor Q11 is connected to the base of a pnp transistor Q12. The emitter of the transistor Q12 is connected to the power source potential $V_{CC}$ by way of a resistor R12. The collector thereof is connected to the collectors of transistors Q13 and Q14 of the pnp type. The transistors Q13 and Q14 cooperate to form a third differential amplifier A3. The base of the transistor Q13 is connected to the collector of the transistor Q2, and collector thereof is coupled with the ground potential $V_{SS}$. The base of the transistor Q14 is connected through a constant voltage source V1 to the ground potential $V_{SS}$. The collector of the transistor Q14 is connected to the collector of an npn transistor Q15, and an output terminal OUT from which a stream of a burst gate pulse is produced. The collector of the transistor Q14 is connected through a resistor R13 to the ground potential $V_{SS}$. The emitter of the transistor Q15 is connected to the ground potential $V_{SS}$, and its base is connected to the collector of the transistor Q1. The base of an npn transistor Q16 is connected to the input terminal IN, and its collector is connected to the power source potential $V_{CC}$. The emitter of the transistor Q16 is connected to the emitters of the transistors Q9 and Q10 that are connected together.

Base of an npn transistor Q17 is connected through a resistor R16 to the input terminal IN. The emitter of this transistor Q17 is connected through a resistor R17 to the ground potential $V_{SS}$, and its collector is connected to the base of an npn transistor Q18 and the collector of a pnp transistor Q19. The collector of the transistor Q17 is connected to the ground potential $V_{SS}$ via a resistor R14. The collector of the transistor Q18 is connected to the base of the transistor Q7, and its emitter is connected to the ground potential $V_{SS}$. The base of the transistor Q19 is connected to the collector of the transistor Q2, and its emitter is connected to the emitter of a pnp transistor Q20. The transistors Q19 and Q20 that are interconnected at the emitters make up a fourth differential amplifier A4. The collector of the transistor Q20 is connected to the ground potential $V_{SS}$, and its base is connected through a constant voltage source V3 to the ground potential $V_{SS}$. The emitters of the transistors Q19 and Q20 are connected together and to the collector of a pnp transistor Q21. The transistors Q21 and Q5 are interconnected at the bases. The emitter of the transistor Q21 is connected through a resistor R15 to the power source potential $V_{CC}$.

The differential amplifiers A1 and A4, transistors Q5 to Q8, Q17 to Q20, resistors R4 to R10, R14 to R17, and constant voltage source V3 cooperate to form a second circuit 20. The differential amplifiers A2 and A3, transistors Q11, Q12 and Q15, resistors R11, R12 and R13, constant voltage sources V1 and V2, and constant current source I2 cooperate to form a third circuit 30.

In the above circuit arrangement, a voltage of the constant current source V3 is smaller than those of the constant voltage source V1 and V2.

FIG. 4 shows a timing chart useful in explaining the operation of the bust gate pulse generating circuit shown in FIG. 3. In FIG. 4, a waveform A represents a variation of a sync separation signal applied to the input terminal IN; a waveform B, a voltage variation of a base signal of each of the transistors Q2, Q8 and Q15; a waveform C, a voltage variation of a base signal each of the transistors Q4 and Q7 or a current variation at the collector terminal of each of the transistors Q5 and Q6; a waveform D, a voltage variation of a base signal of the transistor Q18; and a waveform E, a variation of a base voltage of the transistor Q3; a waveform F, a voltage variation of a signal derived from the output terminal OUT.

When an input signal is absent, viz., no sync separation signal is in a "0" level, the transistor Q1 is turned off. Under this condition, the burst gate pulse generating circuit will operate in either of the following two modes. In a first mode, the transistor Q8 is turned on. In a second mode, a voltage V0, that is obtained by dividing the power source voltage $V_{CC}$ by the resistors R4, R7 and R6 and is given by a relation (1), is applied to the base of the transistor Q4 before the transistor Q8 is turned on. The transistor is turned on, the transistors Q5, Q6, and Q7 are turned on, and finally the transistor Q8 is turned off.

$$V0 = \{(R7+R6)/(R4+R7+R6)\} \times V_{CC} \qquad (1)$$

In the first mode, the transistor Q1 is turned off, the transistors Q2 and Q8 are turned on, and the transistors Q3, Q4, Q5, Q6 and Q7 are turned off. The transistors Q16 and Q9 are turned off, the transistors Q10, Q11, Q12, Q13 are turned on, and the transistors Q14 and Q15 are turned off. Accordingly, the signal at the output terminal OUT becomes "0" in level, as indicated by the waveform F in FIG. 4. In the second mode, the transistor Q1 is turned off, the transistors Q4, Q5, Q6, and Q7 are turned on, and the transistors Q2 and Q8 are turned off. Upon turning off the transistor Q2, the power source potential $V_{CC}$ starts to charge the capacitor C1 through the resistor R3. When the base potential of the transistor Q3 increases to exceed the voltage V0 as given by the relation (1), the transistor Q3 is turned on, so that the transistors Q4 to Q7 are turned off. Then, the transistor Q2 and Q8 are turned on. This state is the same as that in the first mode. Also in the second state, the signal at the output terminal OUT becomes "0" in level as indicated by the waveform F in FIG. 4.

When the sync separation signal rises to "1" level, the transistor Q1 is turned on. The transistors Q2, Q8 and Q15 are cut off. At this time, the base voltage of the transistor Q4 is set to V0 and transistor Q2 is turned off, so that charge to the capacitor C1 starts through the resistor R3 at a time constant as defined by the values of the capacitor C1 and the resistor R3. The base voltage of the transistor Q3 rises as indicated by the waveform E. Until the base voltage exceeds the voltage V0, the transistor Q3 remains cut off, while the transistor Q4 remains turned on. The result is that the transistors Q5, Q6, and Q7 are in an on state and the transistors Q2, Q8 and Q15 are left in an off state.

When the sync separation signal is pulsed from "1" to "0", the transistor Q1 is turned off. At this time, the transistors Q4, Q5, Q6, and Q7 maintain an on state, while the transistors Q2, Q8 and Q15 maintain a cut-off state. The transistors Q10 to Q13 are in an on state. The charge to the capacitor C1 is performed. When the base voltage of the transistor Q13 exceeds the constant voltage V1, the transistor Q14 is turned on and the voltage at the output terminal OUT rises to "1" as indicated by the waveform F in FIG. 4. The charge to the capacitor C1 is succeedingly performed, and the transistor Q10 is cut off. Accordingly, the transistors Q11 and Q12 are cut off, and the current supply to the transistors Q13 and Q14 is stopped. The transistor Q14 is cut off, and the signal at the output terminal OUT drops from "1" to "0". See the waveform F in FIG. 4.

When the base voltage of the transistor Q3 exceeds the voltage V0, the transistor Q3 is turned on, the transistor Q4 is cut off, and the transistors Q5, Q6 and Q7 are cut off. As the result of turning on the transistor Q3, the capacitor C1 thus far being charged is discharged through the transistor Q3 to the ground potential $V_{SS}$. The base voltage of the transistor Q3 is immediately placed at the potential $V_{SS}$. See the waveform E in FIG. 4. Under this condition, the transistor Q1 is cut off, while the transistors Q2, Q8 and Q15 are turned on.

As the result of the cut-off of the transistor Q7, the base voltage of each of the transistors Q2, Q8 and Q15 becomes "1" in level, restoring the initial state of the burst gate pulse generating circuit. See the waveform B in FIG. 4.

Thus, for a normal sync separation pulse, a burst gate pulse of a fixed pulse width appears at a position delayed by a predetermined time behind the normal sync pulse.

As seen from the waveform A in FIG. 4, when noise is contained in the sync separation signal and the signal (depicted as a narrow pulse) rises due to the noise, the transistor Q1 is turned on and the transistor Q2 is cut off, as in case that a normal sync separation pulse is inputted. Accordingly, the charge to the capacitor C1 starts through the resistor R3, and the base voltage of the transistor Q3 starts to rise. See the waveform E in FIG. 4. When the noise pulse drops to "0" level, the transistor Q17 that has been turned on by the noise, is cut off. At this time, the collector voltage of the transistor Q2, or the charge voltage across the capacitor C1 (voltage V4 in the waveform E of FIG. 4), does not yet reach the voltage of the constant voltage source V3. Under this condition, after the transistor Q17 is turned off, the transistor Q19 is turned on. The turning on of the transistor Q19 turns on the transistor Q18 and turns off the transistor Q7. As a result, the transistor Q2 is turned on, and the capacitor C1 thus far being charged is discharged through the on-state transistor Q1. The base voltage of the transistor Q3 drops to a "0" level. See the waveform E in FIG. 4. Consequently, no further burst gate pulse is produced at the output terminal OUT.

To prevent the burst gate pulse from being mistakenly generated due to the noise contained in the sync separation signal, the voltage value of the constant voltage source V3 must be smaller than the voltage V5 (see the waveform E) that is obtained when the capacitor C1 is charged by the power source potential $V_{CC}$ prior to a period T before a normal sync separation pulse arrives at the input terminal INPUT. The period T is equal to the pulse of the input sync separation pulse.

What is claimed is:

1. A burst gate pulse generating circuit which is free from improper operation due to noise pulse comprising:
   first circuit means for generating a first voltage increasing at a predetermined time constant in synchronism with the leading edge of a pulse contained in a sync signal applied thereto;
   second circuit means for stopping the first voltage generating operation by said first circuit means when the trailing edge of said pulse contained in said sync signal arrives at said first circuit means before said first voltage reaches a fixed second voltage; and
   a third circuit means for comparing said first voltage with a fixed third voltage and a fixed fourth voltage which is higher than said fixed third voltage, and generating a train of burst gate pulses which becomes high in level after said first voltage exceeds said fixed third voltage, and low in level after said first voltage exceeds said fixed fourth voltage.

2. The burst gate pulse generating circuit according to claim 1, wherein said first circuit means includes an input terminal for receiving said sync signal, a first transistor whose conduction is controlled by the sync signal supplied to said input terminal, a capacitor connected across the collector-emitter path of said first transistor, and a first resistor connected to a first end of said capacitor and a power source potential.

3. The burst gate pulse generating circuit according to claim 1, wherein said second circuit means includes voltage generating means for generating a fixed fifth voltage larger than said fixed second, third and fourth voltages, first voltage comparing means for comparing said first voltage with said fixed fifth voltage, second voltage comparing means for comparing said first voltage with said fixed second voltage, first control means for controlling said second voltage comparing means in accordance with said sync signal, and second control means for controlling the voltage generating operation of said voltage generating means on the basis of the comparison result by said second voltage comparing means.

4. The burst gate pulse generating circuit according to claim 3, wherein said voltage generating means includes second, third and fourth resistors inserted in series between the power source potential and ground potential.

5. The burst gate pulse generating circuit according to claim 4, wherein said first voltage comparing means includes a first differential amplifier made up of second and third transistors of the npn type which are interconnected at the emitters and supplied with said first and fixed fifth voltages, a fifth resistor connected between the ground potential and the interconnected emitters of said second and third transistors in said first differential amplifier, said fourth resistor connected between the power source potential and the collector of said second transistor in said first differential amplifier, a sixth resistor connected at a first terminal to the power source potential, and a fourth transistor of the pnp type whose collector and base are connected to the collector of said third transistor, and whose emitter is connected to a second terminal of said sixth resistor.

6. The burst gate pulse generating circuit according to claim 3, wherein said second voltage comparing means includes a second differential amplifier made up of fifth and sixth transistors of the pnp type which are interconnected at the emitters and supplied with said first and fixed fifth voltages, a seventh transistor of the pnp type whose collector is connected to the interconnected emitters of said fifth and sixth transistors in said second differential amplifier, and whose base is coupled with the output of said first voltage comparing means, a seventh resistor connected between the power source potential and the emitter of said seventh transistor, an eighth resistor connected between the collector of said fifth transistor in said second differential amplifier and the ground potential.

7. The burst gate pulse generating circuit according to claim 3, wherein said first control means includes an eighth transistor of the npn type whose base is coupled for reception with said sync signal, emitter is coupled with the ground voltage, and the collector is coupled for transmission with said second voltage comparing means.

8. The burst gate pulse generating circuit according to claim 3, wherein said second control means includes a ninth transistor whose base is coupled for reception with the output of said second voltage comparing means and emitter is coupled with the ground voltage, a tenth transistor whose base is coupled with the collector said ninth transistor, and whose base is coupled with the output of said first voltage comparing means, a ninth resistor connected between the emitter of said tenth transistor and the power source potential, a tenth resistor connected between the collector of said ninth transistor and the ground voltage, an 11th transistor of the npn type whose base is connected to the collector of said ninth transistor and whose emitter is connected to the ground voltage, and a 12th transistor whose base is connected to the collector of said 10th transistor, emitter is connected to the ground voltage, and collector is connected to said voltage generating means.

9. The burst gate pulse generating circuit according to claim 1, wherein said third circuit means includes a third voltage comparing means for comparing said first voltage with said fixed fourth voltage, a fourth voltage comparing means for comparing said first voltage and said third voltage, a fixed third control means for controlling the voltage comparing operation of said third voltage comparing means in accordance with said sync signal, and a fourth control means for controlling the voltage comparing operation by said fourth voltage comparing means in accordance with said sync signal.

10. The burst gate pulse generating circuit according to claim 9, wherein said third voltage comparing means includes a third differential amplifier made up of 13th and 14th transistors whose emitters are interconnected and supplied with said first and fourth voltages, a constant current source connected between the ground voltage and the interconnected emitters of said 13th and 14th transistors in said third differential amplifier, an 11th resistor connected at a first terminal to the power source potential, and a 15th transistor of the pnp type whose collector and base are connected to the collector of said 14th transistor in said third differential amplifier, and whose emitter is connected to a second terminal of said 11th resistor.

11. The burst gate pulse generating circuit according to claim 9, wherein said fourth voltage comparing means includes a fourth differential amplifier made up of 16th and 17th transistors whose emitters are interconnected and supplied with said first and fixed third voltages, a 12th resistor connected at a first terminal to the power source potential, and an 18th transistor of the pnp type whose emitter is connected to a second terminal of said 12th resistor, whose collector is connected to the interconnected emitters of said 16th and 17th transistors in said fourth differential amplifier, and whose base is coupled with the output of said third voltage comparing means.

12. The burst gate pulse generating circuit according to claim 10, wherein said third control means includes a 19th transistor of the npn type whose collector is connected to the power source potential, emitter is connected to the interconnected emitters of said 13th and 14th transistors in said third differential amplifier, and base is connected for reception with said sync signal.

13. The burst gate pulse generating circuit according to claim 11, wherein said fourth control means includes a 20th transistor of the npn type whose collector is connected to the interconnected emitter of said 16th transistor in said fourth differential amplifier, emitter is connected to the ground voltage, and whose base is coupled for reception with the inversion of said sync signal.

* * * * *

UNITED STATES PATENT AND TRADEMARK OFFICE
CERTIFICATE OF CORRECTION

PATENT NO.   : 5,038,203
DATED        : August 06, 1991
INVENTOR(S)  : Hideyuki HAGINO et al.

It is certified that error appears in the above-identified patent and that said Letters Patent is hereby corrected as shown below:

Claim 9, column 8, line 13, after "said" insert --fixed--.

Claim 9, column 8, line 13, after "a" Delete "fixed".

Signed and Sealed this

Twenty-fifth Day of May, 1993

Attest:

MICHAEL K. KIRK

*Attesting Officer*      *Acting Commissioner of Patents and Trademarks*